UNITED STATES PATENT OFFICE.

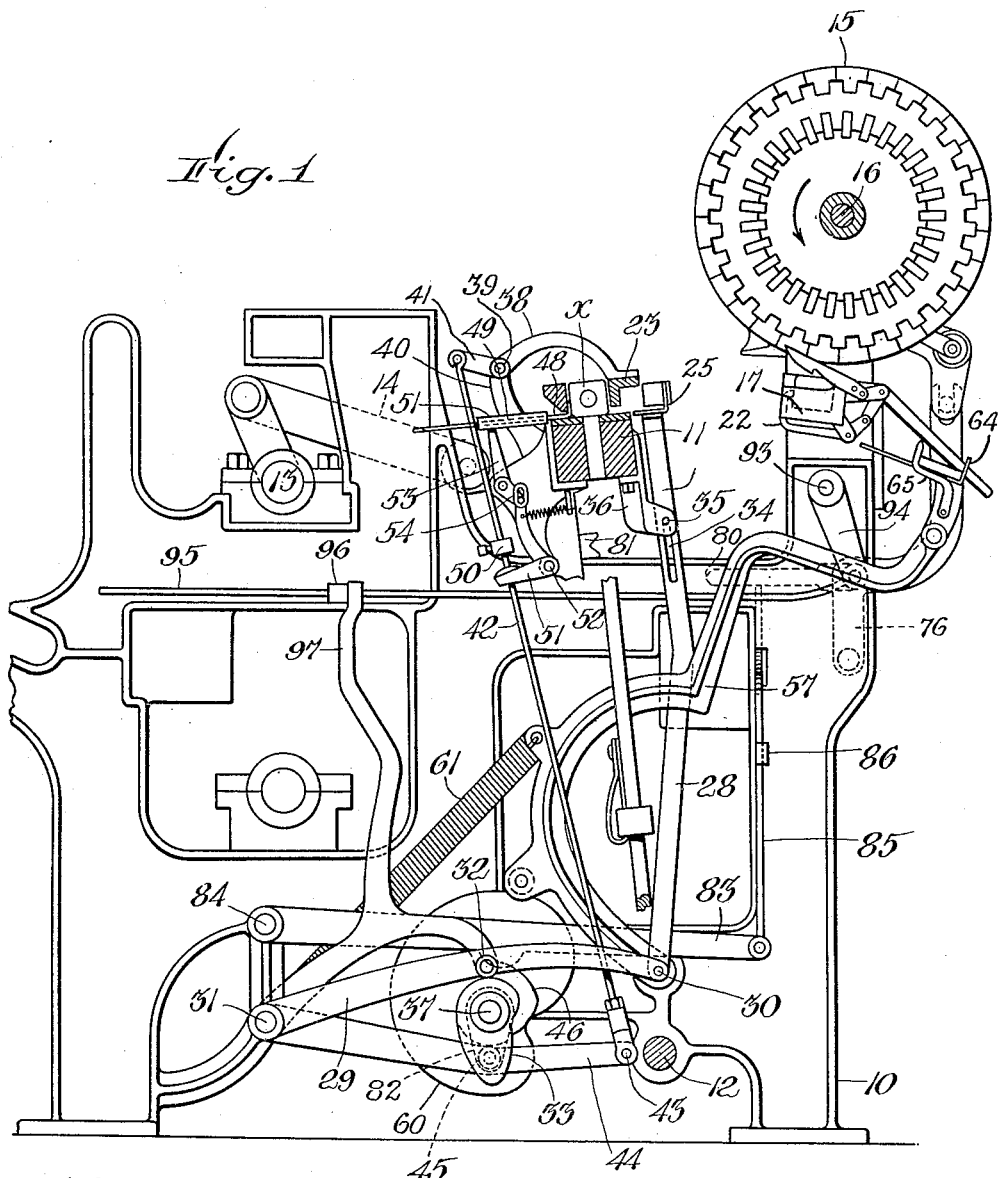

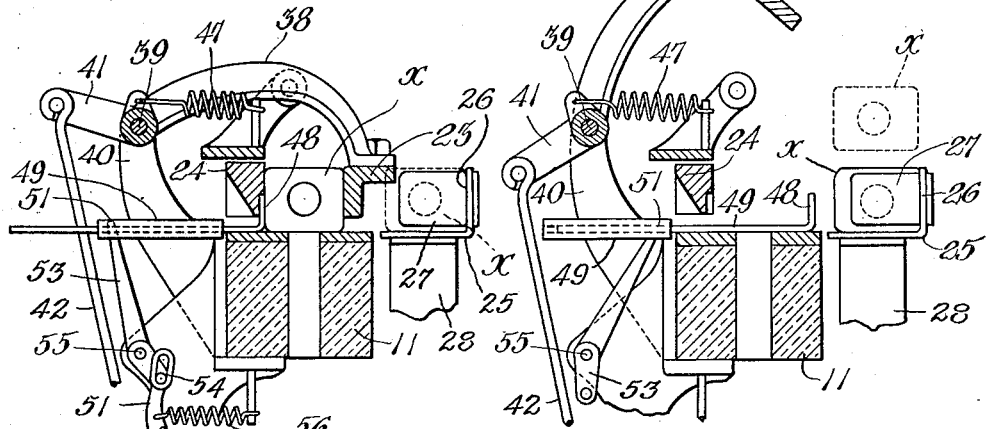

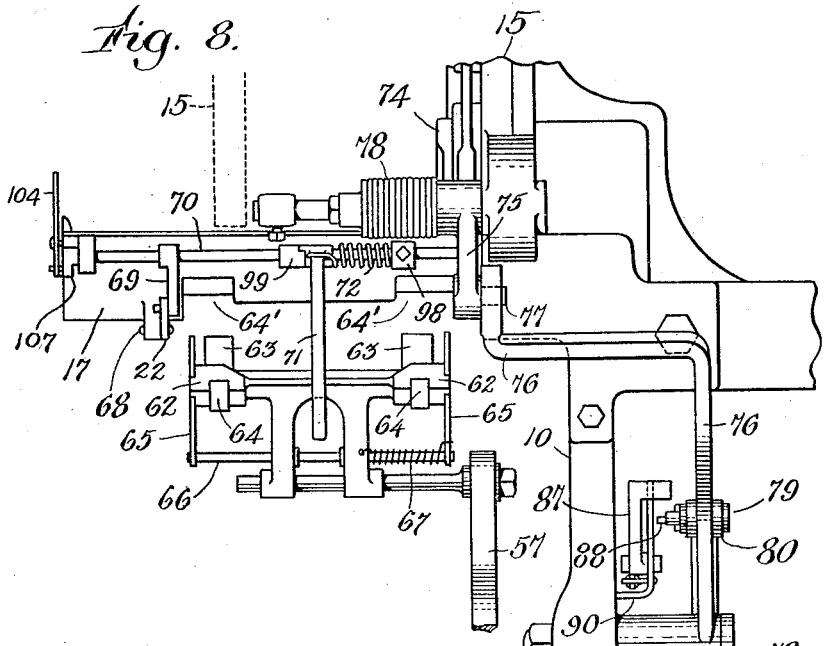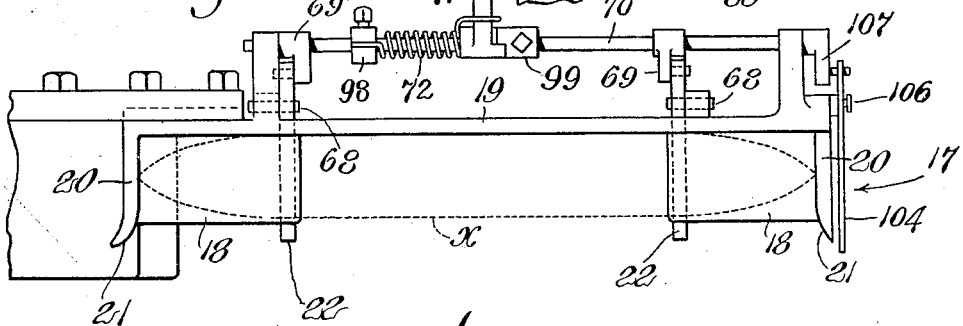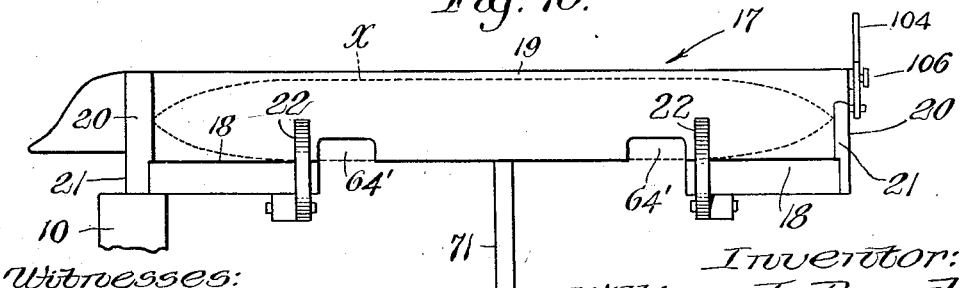

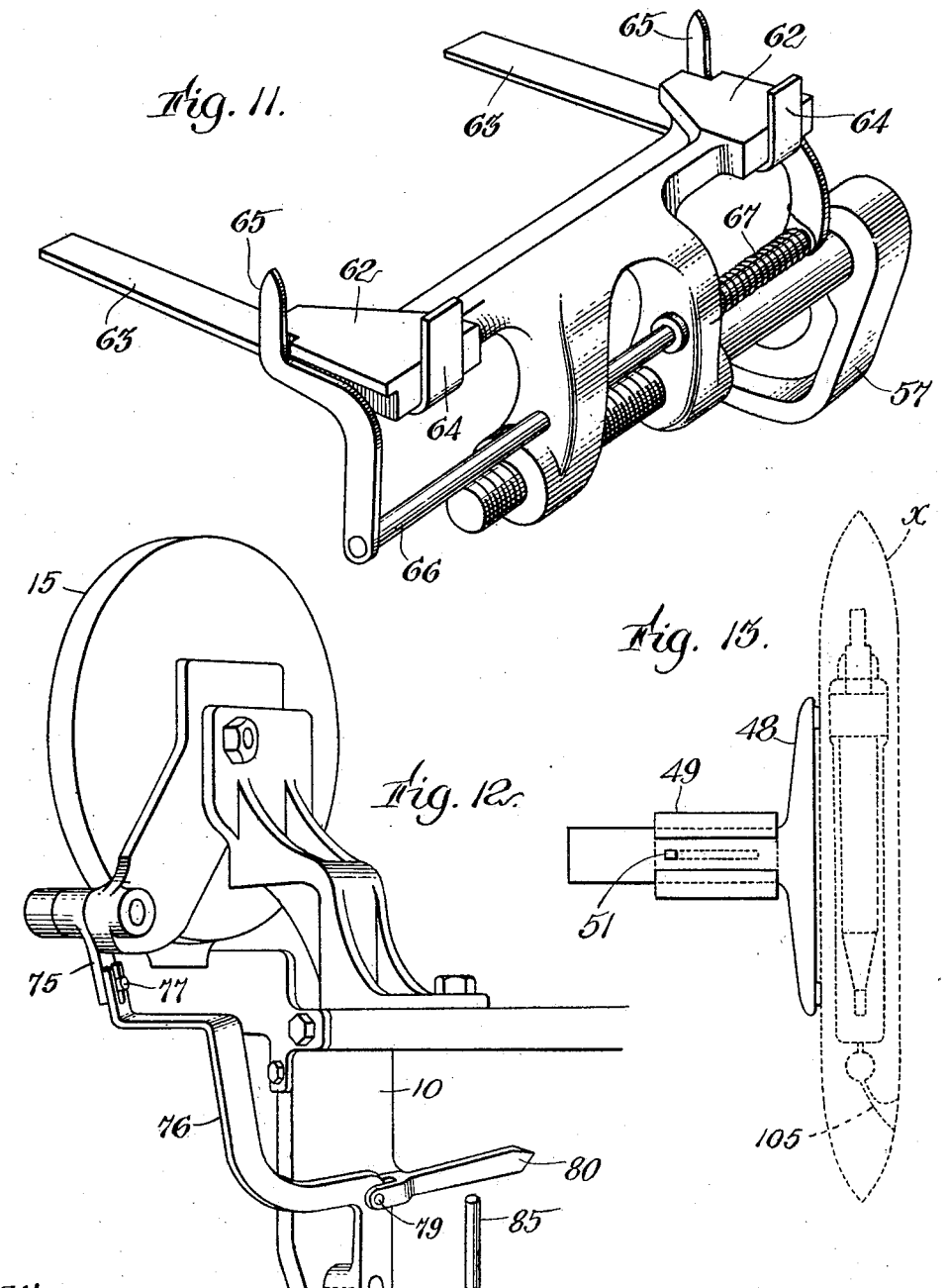

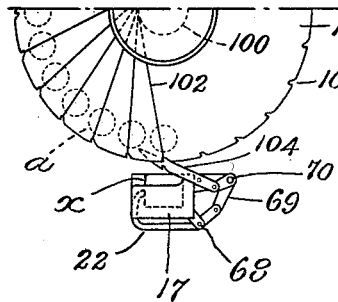
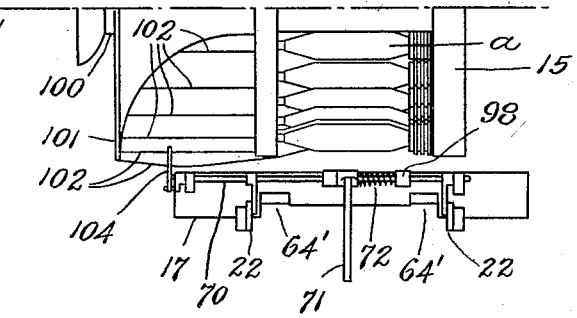
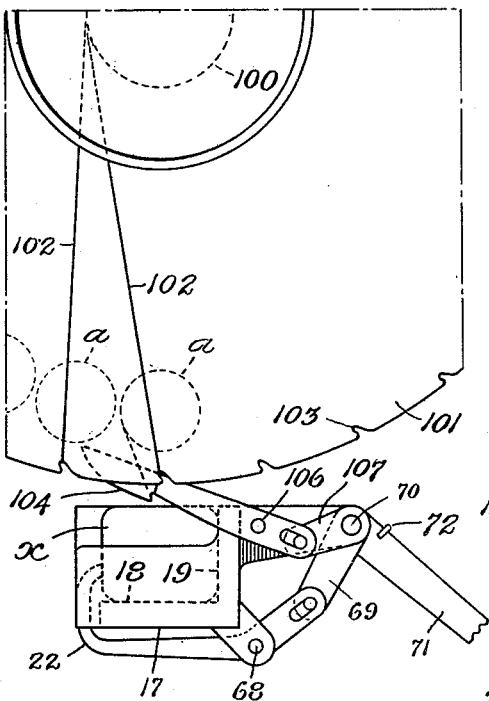
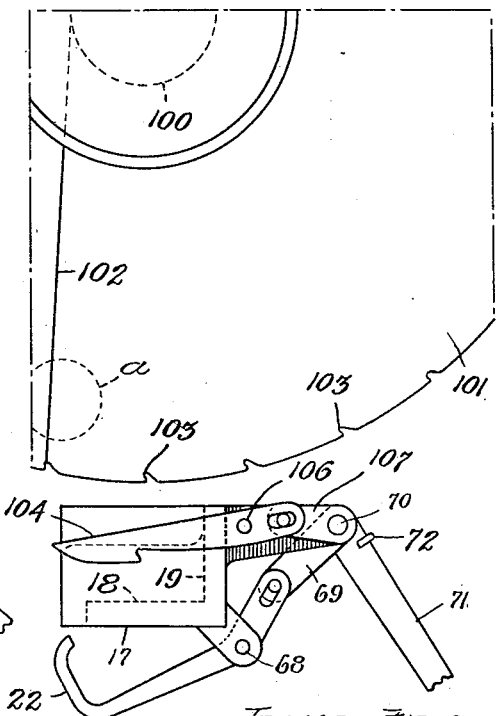

WILLIAM L. BARRELL, OF LAWRENCE, MASSACHUSETTS.

WEFT-REPLENISHING LOOM.

1,221,410.  Specification of Letters Patent.  Patented Apr. 3, 1917.

Application filed April 17, 1913. Serial No. 761,689.

*To all whom it may concern:*

Be it known that I, WILLIAM L. BARRELL, a citizen of the United States, and resident of Lawrence, in the county of Essex and State of Massachusetts, have invented certain new and useful Improvements in Weft-Replenishing Looms, of which the following is a specification.

The present invention relates to weft-replenishing looms of the same general character as that which forms the subject-matter of my copending application, Serial No. 737,967, filed December 21, 1912.

The purpose of the present invention is to provide more efficient and smoother-working mechanism than that shown in the aforesaid application.

Of the accompanying drawings, which illustrate a loom embodying the present invention.

Figure 1 represents a left-end elevation, the shuttle-box parts being shown in section and some parts being otherwise broken away for the sake of illustration.

Fig. 2 represents mechanism, partly in elevation and partly in section, for exchanging shuttles and for loading the shuttles with full bobbins. The viewpoint of this figure is the same as that in Fig. 1.

Fig. 3 represents a vertical section, on a larger scale, of the left end of the lay and the adjacent parts, including a shuttle in operative position in the shuttle box.

Fig. 4 represents a section similar to Fig. 3, showing the parts in different positions, the shuttle being ejected from the shuttle box and resting upon a receiver.

Fig. 5 represents an elevation of a movable member by which the loading mechanism is operated to place a full bobbin in a shuttle.

Fig. 6 represents an elevation of a device for supporting in operative position the operating member shown by Fig. 5.

Fig. 7 represents a rear elevation of the device shown in Fig. 6, the same being attached to the frame of the loom.

Fig. 8 represents a front elevation including the upper left-hand portion of the loom frame, a portion of the bobbin magazine mounted thereon, and a carrier which carries the empty shuttle to the magazine for loading and from the magazine to the lay for use in the loom.

Fig. 9 represents a top plan view of a fixed support which holds a shuttle during the loading operation, in this figure the front of the support being at the top of the figure.

Fig. 10 represents a rear elevation of the support shown by Fig. 9.

Fig. 11 represents a perspective view of the shuttle carrier, the same being included in Figs. 1, 2 and 8.

Fig. 12 represents a perspective view of some of the mechanism shown by Fig. 8.

Fig. 13 represents a top plan view of the ejector by which the empty shuttle is ejected from the lay, the outline of the shuttle being shown in dotted line.

Fig. 14 is an end elevation including the lower half of the bobbin magazine and the shuttle-supporting means.

Fig. 15 is a front elevation of the elements included in Fig. 14.

Fig. 16 is an end elevation, on a larger scale, of the parts shown by Fig. 14.

Fig. 17 is an end elevation of the same parts in a different position.

The same reference characters indicate the same parts wherever they occur.

The construction and operation of the loom in the present instance are similar to those of the well-known weft-replenishing loom made by the Stafford Company of Readville, Massachusetts. This loom comprises the usual weaving mechanism and shuttle-exchanging mechanism, each of which has a driving clutch. These clutches are controlled in such manner that the shuttle-exchanging mechanism remains idle so long as the weaving mechanism is operating, and the weaving mechanism remains idle while the shuttle-exchanging mechanism is operating. The clutches are controlled by suitable well-known devices which cause stopping of the weaving mechanism whenever it is necessary to replenish the weft, the shuttle-exchanging mechanism at that time being automatically started, and when the latter has completed a cycle of operations it is automatically thrown out of operation and the weaving mechanism is again started.

Two shuttles are used alternately and are taken from the lay for loading. There is a bobbin magazine from which a full bobbin is taken to load each shuttle while it is out of the lay. When one shuttle is in the lay the other shuttle is in loading position out of the lay. When it is necessary to replenish the weft, the weaving mechanism is automatically stopped and the wholly or partially spent shuttle is taken out of the lay and a loaded shuttle is carried from loading position to the lay. The means which transfers the loaded shuttle to the lay carries the spent shuttle to loading position. The weaving mechanism is then automatically started, and the shuttle-exchanging mechanism becomes idle. One difference between the present invention and that set forth in my copending application aforesaid is that in the present instance the loading operation occurs while the weaving mechanism is operating, but in my copending application the loading occurs while the weaving mechanism is at rest. Another difference is that in the present instance the shuttle is supported by a fixed support while being loaded, but in my copending application the shuttle rests upon the shuttle carrier while being loaded. The fixed support in the present instance relieves the shuttle carrier of undue strain and renders the loading positive. Other details of my present invention are hereinafter described and are illustrated by the accompanying drawings.

The upright frame member at the left end of the loom is indicated at 10, the front of the loom being at the right of Figs. 1 and 2. The lay 11 is mounted, as usual, upon swords (not shown) and oscillates about the axis of a shaft 12. It is oscillated as usual by a crankshaft 13 with which it is connected by links such as that indicated at 14. The bobbin magazine is indicated as a whole at 15. The structure and operation of this magazine are well known, and it will not be necessary to describe all details of the same. It will be sufficient to state at this time that the magazine is rotated step by step about a central spindle 16, and that the bobbins are arranged in a circular series so that they are brought successively into the position from which they are transferred into a shuttle in loading position. Fig. 1 shows a shuttle $x$ in operative position in the lay, and a similar shuttle in loading position under the magazine.

The shuttle which is in loading position is supported by a stationary holder 17, the same being affixed to the frame of the loom. The details of this holder are shown by Figs. 8, 9 and 10. It comprises two separated supporting portions 18, a front wall 19, and end walls 20, 20, the latter having converging surfaces 21 to facilitate the entrance of the shuttle and to position the latter endwise with relation to the loading mechanism. The shuttle is locked in the holder 17 by fingers 22 hereinafter described. The space between the supporting portions 18 is to enable the empty bobbin to drop to the floor or into a suitable receptacle when forced out through the bottom of the shuttle. The shuttles are of well-known construction and are generally used in conjunction with a magazine such as that illustrated, the construction of the shuttle permitting a full bobbin to enter at the top and force the empty bobbin out through the bottom, the interior of the shuttle being provided with suitable devices for holding the bobbin.

Referring to Figs. 3 and 4, the shuttle on the lay is held in position during the beating-up operation by a movable shuttle box front 23 and a binder 24. The movable member 23 is adapted to be lifted to the position shown by Fig. 4, to permit ejection of the shuttle from the lay. When the shuttle is ejected it passes into a receiver 25 whose shuttle-supporting surface is substantially flush with the shuttle-supporting surface of the lay. This receiver has stops 26 for engaging the front of the shuttle to prevent the shuttle from moving forward too far when ejected from the lay. The receiver also has clips 27 for engaging the ends of the shuttle to maintain the desired longitudinal position of the shuttle. The receiver is affixed to the upper end of a bar 28 whose lower end is pivotally connected to a lever 29, the connection being indicated at 30. The lever 29 is mounted upon a fulcrum 31, and is provided with a cam roll 32 which rests upon a cam 33. The cam lifts the receiver from the position shown by Fig. 3 to lift the ejected shuttle to the position indicated by dotted lines in Fig. 4. The purpose in so lifting the shuttle is to enable the shuttle carrier, hereinafter described, to pass under with a loaded shuttle and to enable the ejected shuttle to descend upon the carrier so that it may be carried away by the carrier. The bar 28 is provided with a guiding slot 34 which is occupied by a pin 35 in a bracket 36 secured to the lay. When the lay is operating, the shuttle-receiver 25 swings with it, the relation of the pivot 30 and rockshaft 12 being such that the arcs of movement of the lay and shuttle-receiver will so nearly coincide that the lay and receiver will not have any appreciable movement relatively to each other.

The cam 33 is affixed to a shaft 37 which is driven by a suitable clutch (not shown) only when the weaving mechanism is at rest. When the weaving mechanism is stopped for replenishing the weft, the clutch for the shaft 37 is automatically connected and causes the shaft to describe one revolution. During this single revolution the necessary exchange of shuttles is made, and then the clutch for the shaft is automatically disconnected and the clutch for the weaving mechanism is automatically connected, all in the well-known manner. The shaft 37 is provided with other cams which operate devices hereinafter described.

The movable shuttle box front 23 is carried by arms 38 which oscillate upon a fulcrum 39. This fulcrum is mounted in suitable brackets 40 carried by the lay. One of the arms 38 has an extension 41 from which extends a rod 42. The lower end of the rod is pivotally connected at 43 to an operating lever 44. This lever is mounted upon the fulcrum 31 hereinbefore mentioned, and is provided with a cam roll 45 which engages a cam 46 on the shaft 37. The shuttle box front is normally held in operative position by a spring 47. When the cam 46 depresses the lever 44 the shuttle box front is lifted to the position shown by Fig. 4, and while it is being lifted an ejector 48 is moved to push the shuttle from the lay to the receiver 25. This ejector is mounted in a suitable guide 49 carried by the lay and is operated by the rod 42 which lifts the shuttle box front. The rod 42 is provided with a collar 50 which engages one arm of a bell-crank lever 51. This lever is mounted upon a fulcrum 52 carried by one of the brackets affixed to the lay. The lever 51 actuates a lever 53, the two levers being connected by suitable pin-and-slot connection indicated at 54. The lever 53 is mounted upon a fulcrum 55, and its free end engages the ejector 48. For this purpose the ejector is provided with a suitable hole through which the end of the lever 51 extends. The levers 51 and 53 are so proportioned that a relatively short movement of the lever 51 will cause a relatively long movement of the ejector. When the parts are in their initial position, as shown by Figs. 1 and 3, the collar 50 is separated from the lever 51 in order to enable the shuttle box front 23 to rise above the top of the shuttle before the ejector pushes the shuttle forward. A spring 56 connected to the lever 51 retracts the ejector when the shuttle box front is lowered. The cam 46 is so formed that it permits the rod 42 to rise part way before the loaded shuttle is placed in the lay. This movement of the rod 42 enables the ejector to return to its initial position, but it still holds the shuttle box front 23 at a sufficient distance above the lay to enable the approaching loaded shuttle to pass under the shuttle box front to operative position.

The shuttle carrier is shown by Figs. 1, 2, 8 and 11. This carrier comprises a lever 57 at the upper end of which are the shuttle-engaging members. The lower end of the lever is mounted upon a fulcrum 58 which is directly above but near the rockshaft 12. The lever is provided with a cam roll 59 which engages a cam 60 on the shaft 37. A spring 61 moves the carrier toward the lay, and the cam moves the lever away from the lay.

Referring to Fig. 11, the carrier has shuttle-supporting surfaces 62 for carrying an ejected shuttle from the receiver 25 to the stationary support 17. The carrier also has supporting fingers 63 for carrying a loaded shuttle from the support 17 to the lay. The ejected shuttle is deposited upon the surfaces 62 by the receiver 25. In order to hold the shuttle in the desired position upon the surfaces 62 the carrier is provided with abutments 64 which engage the front side of the shuttle and with movable fingers 65 which engage the rear side of the shuttle. The fingers 65 are affixed to a rockshaft 66 and are normally held in operative position by a spring 67 coiled about the shaft. As shown by Figs. 8 and 10, the stationary shuttle support 17 is cut away at 64', 64', to provide clearance for the elements 64 and 65. When the carrier moves forward to carry a shuttle to the support 17, the shuttle strikes against the front wall 19 of the stationary support, and the carrier continues to move forward to the position shown by Figs. 1 and 2. The movable fingers 65 are thus caused to swing downwardly because of their engagement with the shuttle, and when their free ends have passed the shuttle they are returned to their normal position by the spring 67. Upon the next movement of the carrier toward the lay, the abutments 65 engage the front side of the shuttle and push the shuttle toward the lay. The shuttle slides along the fingers 22 to the supporting fingers 63 of the carrier and is thereby carried to the lay, the fingers 63 overlapping the lay when the carrier has moved as far as it will go toward the lay. While the carrier is in the position last described, the cam 46 permits the movable shuttle box front 23 to descend to its initial position, thereby depressing the weft end in the throat of the shuttle and confining the loaded shuttle in operative position upon the lay; and when the carrier moves forward, the fingers 63 are withdrawn from under the shuttle and the shuttle then rests upon the lay.

While the carrier is carrying a loaded shuttle toward the lay, the receiver 25 supports the ejected shuttle above the carrier. Then while the carrier is against the lay the cam 33 permits the receiver to descend to deposit the ejected shuttle upon the surfaces 62 of the carrier. The fingers 65 may yield, if necessary, to permit the shuttle to seat on the surfaces 62, and the force of spring 67 causes them to press the shuttle against the abutments 64. The elements 64 and 65 may thus clamp the shuttle by its front and rear faces, to keep it in place on the carrier. The receiver descends below its initial position in order that its upper edge may pass below the bottom of the shuttle which is now resting upon the carrier. The carrier then moves forward to transfer the ejected shuttle to loading position, and then the receiver is returned to its initial position where its shuttle-supporting surface is flush with the upper surface of the lay.

The shuttle-supporting surfaces 18 which support the shuttle for loading are inclined so that the shuttle normally tends to slide toward and engage the front wall 19. As an additional safeguard for locking the shuttle in position for loading I have provided the devices 22. (See Figs. 14 to 17). The devices 22 are mounted upon pivots 68 and have pin-and-slot connection with levers 69. These levers are affixed to a rockshaft 70 which is rocked by a lever 71. This lever is arranged to be engaged by the shuttle carrier when the latter is toward the front of the loom. The lever 71 is not affixed to the rockshaft but is loosely mounted thereon and moves the locking devices 22 to shuttle-engaging position through the medium of a helical spring 72. (See Figs. 8, 9 and 15). One end of the spring engages the lever, and the other end is anchored to a collar 98 which is affixed to the rockshaft. The lever 71, however, acts positively on a collar 99 which is likewise affixed to the rockshaft, the members 71 and 99 having coöperative shoulders, shown by Fig. 9, which enable the lever 71 to act positively to move the locking devices 22 from operative position to the position shown by Fig. 17. The weight of the lever 71, due to its angular position, is sufficient for moving the devices 22 from shuttle-engaging position. When the shuttle carrier is moving forward with an empty shuttle, it deposits the shuttle in the holder 17 before engaging the lever 71, the devices 22 being at that time below the path of the shuttle, as shown by Fig. 17. The shuttle carrier thereafter engages and lifts the lever 71 to the position shown by Figs. 14 and 16, thereby moving the devices 22 to shuttle-engaging position. The shuttle carrier and the lever 71 are shown in coöperative engagement by Figs. 1 and 8. The shuttle holder 17, as shown by Figs. 14 to 17, is in a horizontal position, although its correct position is inclined, as shown by Figs. 1 and 2. The only reason for showing the holder in horizontal position in Figs. 14 to 17 is to expedite the drawings.

I have provided a device for automatically threading the shuttle as often as a full bobbin is placed therein. The bobbin magazine, as is well known, is provided with a weft-end holder, the same being indicated in Fig. 14 at 100. The magazine is also provided with a wheel 101 over whose rim the weft ends 102 are drawn from the bobbins and wrapped around the weft-end holder. The weft-end holder and the wheel are intentionally omitted from Fig. 1. The wheel 101 rotates in unison with the bobbin-engaging parts of the magazine. It is provided with notches 103 in its rim, for the reception of the weft ends. When the weft ends are wrapped around the holder 100, the thread is drawn taut, and there is a considerable free stretch of thread from the bobbin-engaging portion of the magazine to the wheel 101, as shown by Fig. 15. As the bobbins are successively brought into position for loading, their weft ends engage a hook 104, and sliding along the under edge of said hook finally lodge in the barb thereof, as shown by Fig. 16. This hook remains in the position shown by Fig. 16 until the shuttle carrier moves to transfer the loaded shuttle to the weaving mechanism; but before the shuttle is taken out of the holder 17, the hook 104 is depressed and the weft end is thereby pressed downwardly upon the upper side of the shuttle adjacent the throat 105 (Fig. 13). This throat is of the usual and well-known formation in shuttles of this type, and permits threading by drawing the weft end laterally therein. The hook continues to hold the weft end while the shuttle is being transferred to the weaving mechanism, and the weft end is thereby caused to pass laterally into the throat 105, whereby the shuttle becomes threaded while passing to the weaving mechanism, in consequence of the position in which the weft end is held. The shuttle, in passing to the shuttle box carries the weft end under the shuttle box front 23, which upon being lowered holds the weft end against the bottom of the throat 105. The shuttle box front thus acts upon the weft end to maintain the latter in its threaded position in the throat.

The hook 104 is mounted upon a pivot 106 and has a suitable pin-and-slot connection with a lever 107. This lever is affixed to the rockshaft 70 so that the hook is actuated in unison with the shuttle-locking devices 22.

Although the magazine is well known, a brief description will facilitate an understanding of its coöperation with the other elements of the present invention. The full bobbins are indicated at *a*. As the magazine is rotated step by step the bobbins are carried successively against a fixed stop 73. As each bobbin passes to the position last mentioned, it lies above the shuttle and below a loader 74. The loader is a lever whose fulcrum is indicated at 70' in Fig. 2. The loader has an arm 75 which is actuated by a lever 76. The arm 75 and lever 76 are connected by a suitable pin-and-slot connection 77. The loader is normally elevated by a spring 78, and it receives its loading movement from the lever 76. The lever is mounted upon a fulcrum 78 which extends from the frame member 10. A finger 80 (see Fig. 5) is pivotally connected to the lever 76 by a pin 79. This finger is used to transmit movement from the lay to the lever 76 to actuate the loader 74. For this purpose the lay is provided with a member 81 which is adapted to engage the free end of the finger 80. The latter is initially out of register with the member 81, and is placed in operative position by a cam 82 on the shaft 37. This cam engages a lever 83 whose fulcrum is indicated at 84. The free end of the lever 83 is pivotally connected with a rod 85 whose movement is guided by a bearing 86. The upper end of the rod is adapted to engage the finger 80, and except as hereinafter specified the finger 80 rests upon the rod 85. During the operation of the shuttle-exchanging mechanism the free end of the finger 80 is lifted into the arc traversed by the member 81 on the lay. The finger 80 is then supported in operative position by a latch 87. (See Figs. 6 and 7). For this purpose the finger 80 is provided with a pin 88 which extends laterally. The latch 88 is mounted upon a fulcrum 89 carried by a bracket 90 secured to the frame of the loom. The upper end of the latch is normally held against a portion of the bracket 90, as shown by Fig. 6, a spring 91 being connected to the latch for holding it in this position. The pin 88, as shown by Fig. 6, is resting upon the upper end of the latch as if the finger 80 were being supported in position to be engaged by the member 81. The normal position of the pin is shown by dotted lines in Fig. 6. When the free end of the finger 80 is lifted, the pin 88 strikes the inclined surface 92 of the latch and deflects the latch to the position indicated by dotted lines. The pin 88 is lifted above the upper end of the latch and the latch is then returned to its normal position by the spring 91. The lifting cam 82 then permits the rod 85 to descend to its lowest position, but the finger 80 descends only so far as to place the pin 88 upon the upper end of the latch. The loading mechanism is thus placed in readiness for operation, but it is not operated until the shuttle-exchanging mechanism has completed its cycle of operations and the weaving mechanism is started. Upon the first forward movement of the lay the member 81 strikes the finger 80 and moves the lever 76 to operate the loader 74. The finger 80 is thus moved longitudinally, and the pin 88 leaves the latch 87. When the lay moves to the rear the finger 80 may drop until it rests upon the upper end of the rod 85, where it remains until it is again lifted by the cam 82.

The step-by-step rotation of the magazine is caused by the return movement of the loader, all in the well-known manner. The starting of the weaving mechanism is also caused in the well-known manner. For this purpose the loom is provided with a rock-shaft 93 which extends transversely of the loom, at the front. This rockshaft is connected by mechanism (not shown) with the driving clutches. As shown by Fig. 1, a rock-arm 94 is mounted upon the rockshaft and is pivotally connected to a rod 95. A collar 96 is affixed upon the rod in position to be engaged by lever 97. This lever is mounted upon the fulcrum 31 and is actuated by a suitable cam (not shown) on cam shaft 37. The last operation in the cycle of the cam shaft is moving the lever 97 to connect the power for driving the weaving mechanism and to disconnect the power for driving the cam shaft.

Having thus explained the nature of my said invention and described a way of constructing and using the same, although without attempting to set forth all the forms in which it may be made or all the modes of its use, what I claim is:

1. The combination with the shuttle box of a loom, of a bobbin magazine, a fixed support for engaging the bottom of a shuttle to support the shuttle in coöperative relation to said magazine for loading, means for transferring a bobbin from said magazine to a shuttle on said fixed support, and means for interchanging a shuttle on said support and a shuttle in said shuttle box.

2. The combination with the shuttle box of a loom, of a bobbin magazine, a support for holding a shuttle in coöperative relation to said magazine for loading, means for transferring a bobbin from said magazine to a shuttle on said support, and shuttle-changing mechanism having a shuttle transferring device and means for causing said device to transfer a loaded shuttle to said shuttle box and to transfer a spent shuttle to said support.

3. The combination with the shuttle box of a loom, of means for inserting a full bobbin in a shuttle outside said shuttle box, means for transferring the loaded shuttle from said bobbin-inserting means to said shuttle box, and means for engaging the bobbin thread, said transferring means and thread-engaging means being arranged to coöperate to thread the shuttle.

4. The combination with the shuttle box of a loom, of means for inserting a full bobbin in a shuttle outside said shuttle box, means for transferring the loaded shuttle from said bobbin-inserting means to said shuttle box, and means for engaging the bobbin thread to thread the shuttle while the shuttle is being transferred as aforesaid.

5. The combination with the shuttle box of a loom, of means for inserting a full bobbin in a shuttle outside said shuttle box, means for transferring the loaded shuttle from said bobbin-inserting means to said shuttle box, means for holding the loose end of the bobbin thread, and means for depressing the bobbin thread between the bobbin and said end-holding means to thread the shuttle in consequence of transferring the latter from said bobbin-inserting means to said shuttle box.

6. The combination with the shuttle box of a loom, of means for loading a full bobbin into a shuttle outside said shuttle box, a fixed support for engaging the bottom of a shuttle to support the shuttle in loading position, and means for transferring a spent shuttle to said support for loading and for transferring a loaded shuttle to said shuttle box.

7. The combination with the shuttle box of a loom, of means for loading a full bobbin into a shuttle outside said shuttle box, a fixed support for engaging the bottom of a shuttle to support the shuttle in loading position, means for engaging a shuttle in loading position to prevent lateral displacement of the shuttle, said means being movable to release the shuttle, and means for transferring the loaded shuttle from said support to said shuttle box.

8. The combination with the shuttle box of a loom, of means for loading a full bobbin into a shuttle outside said shuttle box, means for supporting a shuttle in loading position, said means consisting of a surface for engaging the bottom of the shuttle and an abutment for engaging one side of the shuttle, said surface being inclined to cause the shuttle to settle by gravity against said abutment, and means for transferring a loaded shuttle from said supporting means to said shuttle box.

9. The combination with the shuttle box of a loom, of means for loading a full bobbin into a shuttle outside said shuttle box, a support for supporting a shuttle in loading position against lateral movement, means for locking a shuttle in loading position on said support, said means being movable to release the shuttle, and means for transferring the loaded shuttle from said support to said shuttle box.

10. The combination with the shuttle box of a loom, of means arranged to put a full bobbin into a shuttle outside said shuttle box, and means arranged to thread the shuttle outside said shuttle box, said shuttle-threading means including means arranged to transfer the threaded shuttle to said shuttle box.

11. The combination with the shuttle box of a loom, of means for loading a full bobbin into a shuttle outside said shuttle box, means for transferring a loaded shuttle to said shuttle box, and means adapted to act upon the loose end of bobbin thread during the transferring of the loaded shuttle to the shuttle box, to thread the shuttle.

12. The combination with the shuttle box of a loom, of means for loading a full bobbin into a shuttle ouside said shuttle box, means for transferring a loaded shuttle to said shuttle box, and means adapted to thread the loaded shuttle in consequence of transferring the latter to said shuttle box, said threading means being arranged to keep said thread in the delivery throat of the shuttle until the aforesaid transferring of the shuttle is completed.

13. The combination with the shuttle box of a loom, of means for loading a full bobbin into a shuttle outside said shuttle box, means for transferring a loaded shuttle to said shuttle box, a thread-engaging device arranged to depress the loose end of the bobbin thread of the loaded shuttle, and means for operating said device to hold said thread below the top of the loaded shuttle while the latter is being transferred as aforesaid, whereby said shuttle is threaded in consequence of being so transferred.

14. The combination with the shuttle box of a loom, of means for loading a full bobbin into a shuttle outside said shuttle box, means for transferring a loaded shuttle from said loading means to said shuttle box, means for acting upon the weft end of the bobbin in the shuttle to place said weft end in the throat of the shuttle before the shuttle is placed in said shuttle box, a movable shuttle box front for retaining the shuttle in said shuttle box, and means for raising said shuttle-box front to enable such loaded shuttle and weft end to pass thereunder while being transferred as aforesaid, and for lowering said shuttle box front below the top of the loaded shuttle to confine the shuttle in the shuttle box and to confine said weft end in the throat of the shuttle.

15. The combination with the shuttle box of a loom, of means arranged to put a full bobbin into a shuttle outside said shuttle box, means arranged to transfer the filled shuttle from said loading means to said shuttle box, and means arranged to coact with said transferring means to thread the filled shuttle.

16. The combination with the shuttle box of a loom, of a shuttle-support, means arranged to put a full bobbin in a spent shuttle on said support, movable means arranged to confine the shuttle on said shuttle-support, a shuttle-carrier and operating means therefor arranged to transfer the filled shuttle from said shuttle-support to said shuttle box, said confining means being operable by said shuttle-carrier and being arranged to release the shuttle in consequence of movement of said carrier toward said shuttle box.

17. The combination with the shuttle box of a loom, of a shuttle-support, means including a shuttle-carrier arranged to transfer a spent shuttle from said shuttle box to said shuttle-support, means arranged to be actuated by said shuttle-carrier to confine the shuttle on said shuttle-support, and means arranged to put a full bobbin in the shuttle on said shuttle-support.

18. The combination with the shuttle box of a loom, of means arranged to put a full bobbin in a spent shuttle outside said shuttle box, a weft-end-holder, means arranged to transfer the shuttle from said loading means to said shuttle box, and means arranged to engage the weft-end between the shuttle and said weft-end-holder, the latter said means being operable by said transferring means to thread the shuttle.

19. A shuttle-changing loom comprising in combination shuttle-loading means arranged to put a full bobbin into a shuttle, a shuttle carrier, means for transferring a spent shuttle from the shuttle box to said carrier, said carrier having means arranged to engage the sides of the shuttle to keep the shuttle in place, and means for moving said carrier to transfer the shuttle to said loading means.

20. A shuttle-changing loom comprising in combination shuttle-loading means for putting a full bobbin into a shuttle, a shuttle carrier having an abutment arranged to engage one side of the shuttle thereon, means for transferring a spent shuttle from the shuttle box to said carrier, means arranged to force the shuttle against said abutment on said carrier, and means for moving said carrier to transfer said shuttle to said loading means.

21. A weft-replenishing loom comprising in combination a bobbin magazine, means arranged to transfer a full bobbin from said magazine to a shuttle, thread-holding means separated from the shuttle, means arranged to move the outlying bobbin thread into potential relation with said thread-holding means, and means arranged to transfer the shuttle to the shuttle box of the loom, said thread-holding means being arranged to draw the thread laterally into the throat of the shuttle in consequence of the transferring of the shuttle to the shuttle box.

22. A shuttle-changing loom comprising in combination shuttle-loading means for putting a full bobbin into a shuttle, a shuttle carrier having keepers arranged to engage the sides of the shuttle to keep the shuttle in place, means for transferring a spent shuttle from the shuttle box to said carrier between said keepers, and means for moving said carrier to transfer the shuttle to said loading means.

In testimony whereof I have affixed my signature, in presence of two witnesses.

WILLIAM L. BARRELL.

Witnesses:
WALTER P. ABELL,
P. W. PEZZETTI.

Copies of this patent may be obtained for five cents each, by addressing the "Commissioner of Patents, Washington, D. C."